(12) United States Patent
N et al.

(10) Patent No.: US 8,935,362 B2
(45) Date of Patent: Jan. 13, 2015

(54) MULTI-MEDIA FILE EMULATION DEVICE

(75) Inventors: Vadivelu N, Sivagangai (IN); Satishkumar Ramaraj, Coimbatore (IN); Hari Bojan, Bangalore (IN)

(73) Assignee: SMSC Holdings S.A.R.L., Luxembourg (LU)

( * ) Notice: Subject to any disclaimer, the term of this patent is extended or adjusted under 35 U.S.C. 154(b) by 271 days.

(21) Appl. No.: 13/480,500

(22) Filed: May 25, 2012

(65) Prior Publication Data

US 2013/0318205 A1  Nov. 28, 2013

(51) Int. Cl.
*G06F 15/16* (2006.01)

(52) U.S. Cl.
USPC ............ 709/219; 709/217; 709/218; 709/231

(58) Field of Classification Search
CPC ................. H04L 29/06027; H04L 2012/2849; H04L 65/607; H04L 65/60
USPC .................................. 709/217, 218, 219, 231
See application file for complete search history.

(56) References Cited

U.S. PATENT DOCUMENTS

| | | | | |
|---|---|---|---|---|
| 6,804,455 B1 * | 10/2004 | Yoo et al. | ...................... | 386/230 |
| 2009/0063694 A1 * | 3/2009 | Foo et al. | ...................... | 709/231 |
| 2010/0011404 A1 * | 1/2010 | Douillet et al. | ............... | 725/127 |
| 2011/0016494 A1 * | 1/2011 | Linhardt | .......................... | 725/62 |
| 2012/0192243 A1 * | 7/2012 | Hall | .............................. | 725/118 |

FOREIGN PATENT DOCUMENTS

| | | | | |
|---|---|---|---|---|
| GB | 2377574 A | 1/2003 | .............. | G06F 9/445 |
| WO | 2008/021240 A2 | 2/2008 | ............... | H04N 7/26 |
| WO | 2009/133432 A1 | 11/2009 | .............. | H04L 29/06 |
| WO | 2011/143403 A2 | 11/2011 | ............... | H04N 7/16 |

OTHER PUBLICATIONS

International Search Report and Written Opinion, Application No. PCT/US/2013/042721, 8 pages, Sep. 25, 2013.

* cited by examiner

*Primary Examiner* — Liangche A Wang
(74) *Attorney, Agent, or Firm* — King & Spalding L.L.P.

(57) ABSTRACT

An emulation device is used to stream media content from a digital media server to a digital media renderer. The emulation system receives a pulse code modulation data stream from the digital media server via a network interface, and stores the data in a buffer. The emulation system is attachable to the digital media renderer, and is recognized as a storage device containing an emulated media file. When the digital media renderer plays the emulated media file, the emulation device reads the PCM data from the buffer to use as sound or video data of the emulated media file.

24 Claims, 4 Drawing Sheets

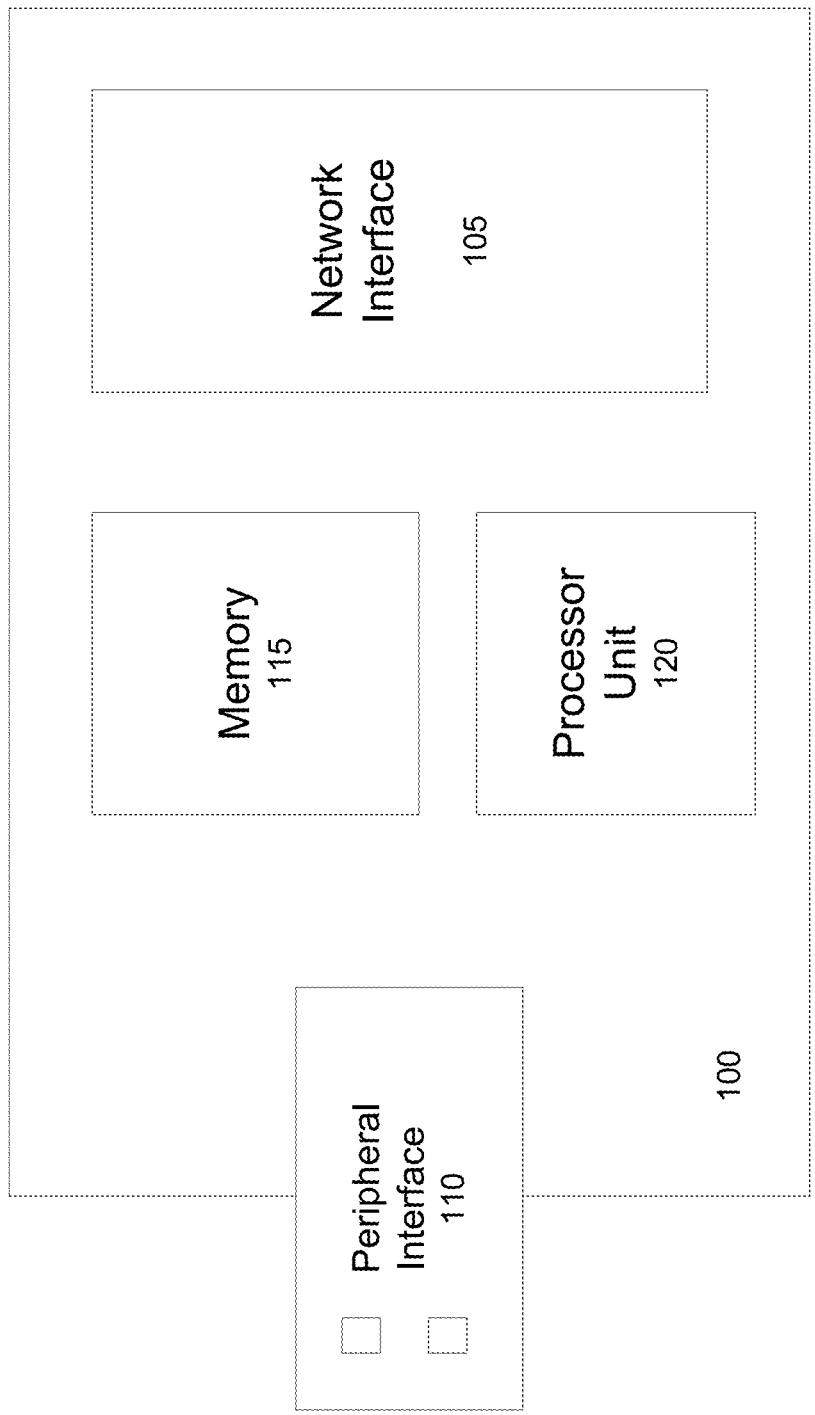

MULTI-MEDIA FILE EMULATION DEVICE

TECHNICAL FIELD

The present invention relates to streaming media content, and more particularly to an apparatus and a method for streaming media content from a remote media source to a media renderer.

BACKGROUND

Virtually all multimedia content is distributed in a digital format through a variety of online services. For example, consumers purchase or even rent, music and movie from services like iTunes® online store, in a form suitable for storing and playing on their compatible electronic devices. In doing so, consumers often use their personal computer as a primary vehicle for obtaining, storing, and accessing multimedia content. Mobile electronic devices have vastly improved their functionality and storage capacity, and they also serve as a personal mobile media library for some individuals. For example, mobile devices such as the current generation iPod Touch®, iPhone® and iPad®—collectively referred hereinafter as "iOS" devices—produced by Apple Computer, Inc., can hold more than 14,000 music files in their internal storage.

Having a central repository of digitized multimedia content in a single device is a convenient way of managing one's multimedia collection in an organized fashion. When it comes to the quality of playback, however, a full-scale dedicated audio-video (AV) device like a home theatre system often outperforms the playback quality of typical computers or portable media players. To experience the modern multimedia content in higher definition and fidelity, a way to link the media source and the media player was needed.

With most, if not all media content being in a digital format, it has become common for consumer electronics to provide an interface for transferring media content from one device to another. A Universal Serial Bus (USB) is one example of the interface, which is commonly found in many consumer electronic devices these days. A user can play a movie or music file stored in a USB Mass Storage Device (MSD) by simply plugging in the MSD into the USB port of media entertainment devices, such as a television, Blu-ray player, or AV receiver. Devices that have physical interfaces like the USB port or flash memory card slot are often pre-loaded with an intrinsic software interface driver, which enables the device to retrieve content from the USB MSD or memory card.

Although delivering media content by using the removable storage device has worked well, the method has a number of drawbacks. Because the user is essentially making a copy of the media content (e.g., music/movie file), not only does the method defeat the original purpose of having a centralized media repository, but it also creates various copyright and digital rights management (DRM) huddles. Further, the sizes of media files have grown significantly in recent years due to the higher quality of media content. Often considerable time is required to transfer media files by using the removable storage device. These drawbacks have prompted a strong desire among consumers to utilize their home networks to store and directly stream media content, integrate TVs as the "hub" from which to access data and entertainment, use mobile devices to access or transport media and more.

In such a networked environment, a device storing the user's media library can stream multimedia content to devices for playing or rendering the media content by using a set of networking protocols. One example of such media streaming oriented networking protocol is the Real Time Streaming Protocol (RTSP), which is designed for use in entertainment and communications systems to control streaming media servers. The devices operate in a server-client manner, and the protocol is used for establishing and controlling media sessions between end points. The device providing the media content acts as a media server and the device receiving the media content acts as a media client, and there may be multiple media servers and multiple media clients. The protocol also handles the communication control commands between the devices. For example, client of a media server can issue media playback commands, such as play and pause, to facilitate real-time control of playback of media files from the server.

To provide greater interoperability between various consumer electronic devices in the market, a group of organizations called Digital Living Network Alliance (DLNA) has created a set of industry standards and device classifications. For purposes of clear explanation, the same device classifications and terms defined by DLNA are used throughout the present disclosure. Devices that store media contents and make it available to other networked devices are classified as Digital Media Server (DMS). Examples of DMS include a personal computer (PC), network attached storage (NAS) device, as well as networked portable media players like the iPod®. Devices that render the multimedia content "pushed" from a DMS are classified as Media Renderer (DMR). Examples of DMR include TVs, home theatre systems, and remote speakers. Digital Media Players (DMP) are devices that can play media content "pulled" from a DMS. The main distinction between the DMR and DMP is how the media content are delivered to the device. It is generally easier to stream media content to DMR devices because DMR devices can be externally controlled by a Digital Media Controller (DMC), which can find media content on the DMS and "push" the media content to DMR. It should be noted that some devices can fall into multiple classifications. For example, an iPod® may function as a DMS (e.g., stores media content and streams to other devices), as a DMP (e.g., retrieves a file and play), as well as a DMC (controls streaming from and to other devices).

Some companies came up with their own proprietary media streaming protocols. For example, the "AirPlay" developed by Apple Computer, uses a collection of proprietary networking protocols suited for streaming various types of media content from any iOS devices (e.g., devices with iOS operating system) or computers running iTunes® software to compatible entertainment devices on the network. Particularly with music, immense popularity of portable media players, such as iPod® or iPhone® produced by Apple Computer, has created a new market for AirPlay enabled speakers and other accessories.

Wireless media streaming is a joy to use when it works. In a perfect world a user can simply connect all his devices to his Wi-Fi network and share media content between them. In reality, however, there are often a number of hurdles to overcome. For example, both DLNA certified devices and AirPlay enabled devices have the features built-in to the devices, and there aren't any universal DLNA or AirPlay adaptors available. This means that if a user's mobile phone or MP3 player isn't DLNA certified or AirPlay enabled, it simply can't be used for streaming media to other devices on the network. Similarly, even if the user's stereo system is connected in the network, it won't be able to receive media content from other devices unless the device is installed with the compatible software to communicate with other devices. In other words, consumers are often forced to replace his non-DLNA certified or non-AirPlay compatible devices if he wants to take the full advantage of either one of the media streaming solutions.

Thus, there exists a need for an apparatus and method for improving interoperability between the devices to share media content over the consumer's existing network.

SUMMARY

Briefly described, and according to one embodiment, the present disclosure describes a method and a device for streaming media content from a remote media server to a media renderer by providing a locally accessible static media file to the media renderer.

One embodiment of the present disclosure is a method for streaming media content from a remote media server to a media renderer via an emulation device. Upon connecting the emulation device to the media renderer by using a peripheral interface, the emulation device is recognized by the media renderer as a storage, which contains a static media file. The media file is described as "static" because the media renderer recognizes the media file as a file having its full contents already stored in the storage. The media file can be an audio file or a video file. It is sufficient that the media file is a container or a wrapper format file, which is made of a series of modular parts (e.g., chunks, atoms, or segments) including specific parts for the media data portions. The emulation device is also connected to the remote media server via a suitable wireless network interface. When the remote media server transfers a stream of media data, the emulation device stores the incoming stream of media data in its buffer. The stream of media data stored in the buffer is used as the media data portion of the media file that is rendered by the media renderer.

One aspect of the present disclosure is an emulation device for streaming media content from a remote media server to a media renderer. The emulation device comprises a peripheral interface connecting the emulation device to the media renderer. One or more wireless network interfaces are also included in the emulation device for connecting the emulation device to the media server that is available to send a stream of media data. The emulation device is provided with a memory. The memory can be used to implement a buffer for storing the stream of media data received from the media server. The memory can also store a set of executable instructions for emulating a media file that can be rendered by the media renderer as well as the instructions for establishing the connection with the remote media server. Such executable instructions are executed by the processing unit of the emulation device.

In accordance with another embodiment, the emulation device, which is interposed between a media server and a media renderer, is configured to buffer a stream of pulse code modulation (PCM) data transmitted from the media server. The emulation device then provides the buffered PCM data as a series of data chunks of a static audio file being rendered by the media renderer.

BRIEF DESCRIPTION OF THE FIGURES

FIG. 1 is a schematic block diagram that illustrates an exemplary emulation device according to embodiments of the present invention.

Figure 2A:
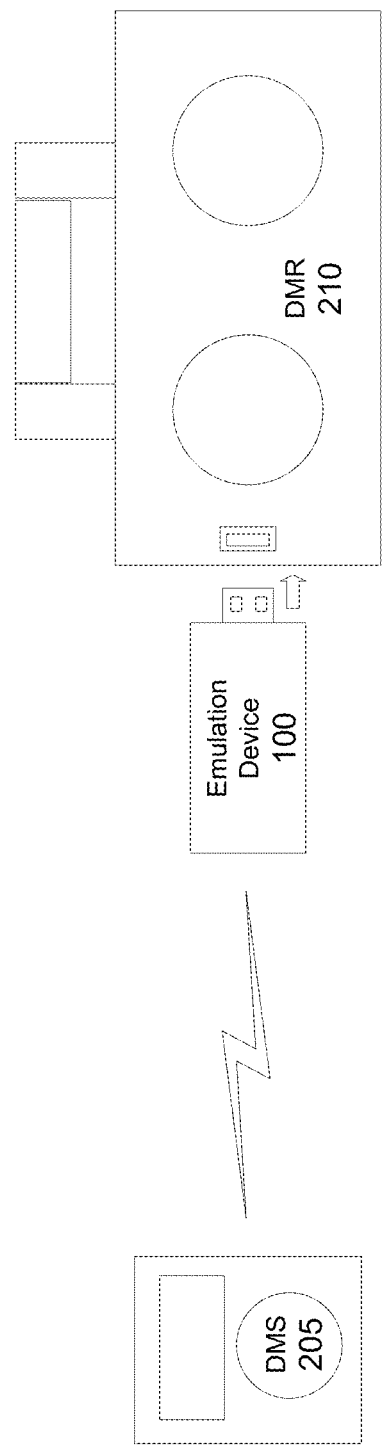
FIG. 2A is a schematic block diagram that illustrates an exemplary one-to-one connection that can be made by interposing an emulation device between a digital media server and a digital media renderer.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Overview

In the following description, numerous specific details are set forth to provide a thorough understanding of the present invention. However, it will be obvious to one skilled in the art that the present invention may be practiced without some or all of these specific details. In other instances, well known process steps have not been described in detail in order to avoid unnecessarily obscuring the present invention.

The present invention generally allows for streaming multimedia content to a device, enables it to function as a DMR even if the device wasn't originally provided with suitable hardware and/or software to receive media stream from other devices via a wireless network. This is achieved by using an emulation device interposed between the DMS and DMR. The emulation device is attachable or otherwise connectable to a device that the user wishes to use as a DMR. As previously mentioned, many modern AV media entertainment devices have the ability to access a directly attached storage device and play media files stored therein. Accordingly, the emulation device is configured so that it is recognized by the media rendering device as a storage device upon being attached or otherwise connected.

The emulation device establishes a connection to various devices that are capable of streaming media content via a wireless network connection. When the emulation device is simultaneously connected to both the DMR device and the DMS device, the emulation device receives media stream data and emulates it as a media file stored in a mass storage device, which is made accessible to the media rendering device. Emulating the media file is generally achieved by buffering a predetermined amount of the media stream data, and using the buffered data as the data portion of the media file presented to the DMR. Using the buffered data, the emulation device presents the media stream data to the DMR, preferably, at the rate that is at least equal to the data-rate of the emulated media file format, such as Waveform file format (WAV) or Audio Interchange file format (AIFF). Since the average throughput of the emulation device to the DMR is preferably no less than the bit-rate of the emulated media file, continuous playback of the streamed media content can be achieved.

Exemplary Emulation Device

FIG. 1 is a simplified block diagram illustrating an exemplary emulation device 100 according to an embodiment of the present disclosure. The emulation device 100 includes a network interface 105, a peripheral interface 110, a memory 115, and a processor unit 120. The network interface 105 provides wireless connectivity to a DMS by using one or more compatible wireless network standards, such as IEEE 801.22 a/b/g/n, and Bluetooth. Although not shown in FIG. 1, an external antenna may be coupled to the network interface 105 to increase the operating range of the emulation device 100. To reduce the overall size of the emulation device 100, however, the network interface may utilize an on-board printed circuit board (PCB) antenna.

The peripheral interface 110 may include one or more connectors suitable for attaching the emulation device 100 to the devices that the user wishes to use as a DMR. Because many existing multimedia devices include a USB interface for connecting a mass storage device and playing media files therefrom, a USB interface is often used in this application to illustrate the peripheral interface 110. However, it should be obvious to the skilled in the art that other interfaces, such as SATA, FireWire, Thunderbolt, or any other interfaces which may be developed later, can be used for the peripheral interface 100.

The memory 115 may include one or more different types of memory which may be used for performing device functions. For example, the memory 115 may include cache, Flash, Read-Only Memory (ROM), and/or Random-Access Memory (RAM). Some type or portions of memory may specifically be dedicated for certain tasks or for storing firmware or the set of executable instructions. As described above, the emulation device 100: (1) receives media stream data from a DMS, (2) stores the received media stream data in a buffer, and (3) provides the media stream data as a media file locally stored in a mass storage device. The firmware for the emulation device 100 and other executable codes for carrying out the aforementioned functions are generally stored in a non-transitory storage medium. For instance, a non-volatile memory like a flash memory or a ROM may be used for storing the firmware or other executable instructions. For buffering the media stream data, cache, RAM, or even a flash memory can be used.

The processor unit 120 for executing the set of executable codes for carrying out the functions of the emulation device 100 may be implemented with a single or multi-core processor (e.g., commercially available CISC or RISC processor), a plurality of interconnected processors or a custom designed state machines implemented as an application specific integrated circuit (ASIC) or field programmable gate array (FPGA). Preferably, the emulation device 110 is configured to obtain power from the DMR via the peripheral interface to operate without an additional power supply. The emulation device 110, however, may include an independent power source, so that it can operate even before being attached to the DMR or when the peripheral interface does not provide the power.

For purposes of clearer explanation, FIG. 1 illustrated each component as a discrete functional block. In various embodiments, however, some or all of the components may be combined together. For instance, processor unit 120 may have an integrated network interface module to wirelessly communicate with other devices, and may also have cache memory to buffer the media stream data received from a DMS.

Exemplary Ad-Hoc Connection

FIG. 2A is a block diagram illustrating an exemplary environment 200 in which an embodiment of emulation device 100 is used to stream media content from a DMS 205 to a DMR 210. In this example, DMS 205 is a mobile media player, such as iPod® that stores the user's media library. DMS 205 includes a network interface of its own for communicating with other devices, including the emulation device 100. Similar to the network interface included in the emulation device 100, the network interface for DMS 205 is also a wireless network interface using one of the IEEE 802.11 standards or Bluetooth standard. Any other network standards currently known or developed later can be used, as long as the network standard allows for data communication between the DMS 205 and the emulation device 100.

In some other exemplary environments, however, a full-scaled media player like a CD/DVD player or a personal computer (PC) may also function as the DMS 205. It is sufficient that the device acting as the DMS 205 contains media content and is able to connect to the emulation device 100 to stream media content.

In FIG. 2A, the DMR 210 is illustrated as an audio player. Other multimedia devices, such as a TV, car stereo, or even a portable media player may also function as the DMR 210. As mentioned above, recent evolution of entertainment devices has provided these devices with the ability to play multimedia files stored in directly attached storage devices. For example, the audio player shown in FIG. 2A may include a USB port or a memory card slot for reading and playing multimedia files stored therein. It is sufficient that a DMR natively supports playing multimedia files from a connected mass storage device.

To utilize such playback function built into the DMR devices, the emulation device 100 is provided with a peripheral interface compatible with the DMR 210 to achieve necessary connection between the devices. In some other embodiments, the emulation device can be implemented in a flash memory card form, such as a Secure Digital card (SD) or Compact Flash (CF) card. In such cases, the necessary connection can be made through a memory card slots available in the DMR 210.

As will be discussed in further detail below, the emulation device 100 emulates a storage device directly attached via the peripheral interface. Typically, the DMR 210 is configured to comprehend the file system of the storage device and to read the content of a media file by using conventional storage access protocols, for example and without limitation, a Serial Peripheral Interface (SPI), a Small Computer System Interface (SCSI), or any other suitable interface protocol.

In the example shown in FIG. 2A, the emulation device 100 is directly connected to the DMS 205 via a wireless network without using any network connection devices (e.g., routers or switches). To achieve such an ad-hoc connection, the emulation device 100 may include executable instructions for pairing itself with a DMS 205. When a connection between the DMS 205 and the emulation device 100 is established, the DMS 205 recognizes the emulation device 100 as a DMR 210 available destination to stream media data. Accordingly, the user interface of DMS 205 may present an option to stream the media content to the DMR 210. The user may interact with the user interface provided on the DMS 205 to play songs. When the user selects the option to stream the music to the DMR 210, the DMS 205 starts to send media stream data of a predetermined format. Even though the media content in the DMS 205 may be in various file formats, such as MP3, AAC, WMA, etc., it is preferred that the DMS 205 or a DMC (not shown) decodes and/or transcode these various audio formats, and streams pulse code modulated (PCM) data to the emulation device 100. This eliminates the need for the emulation device 100 to include a decoder to handle multiple file formats, and also reduces the hardware performance requirements of the emulation device 100.

Exemplary Connections in an Infrastructure Network

Figure 2B:
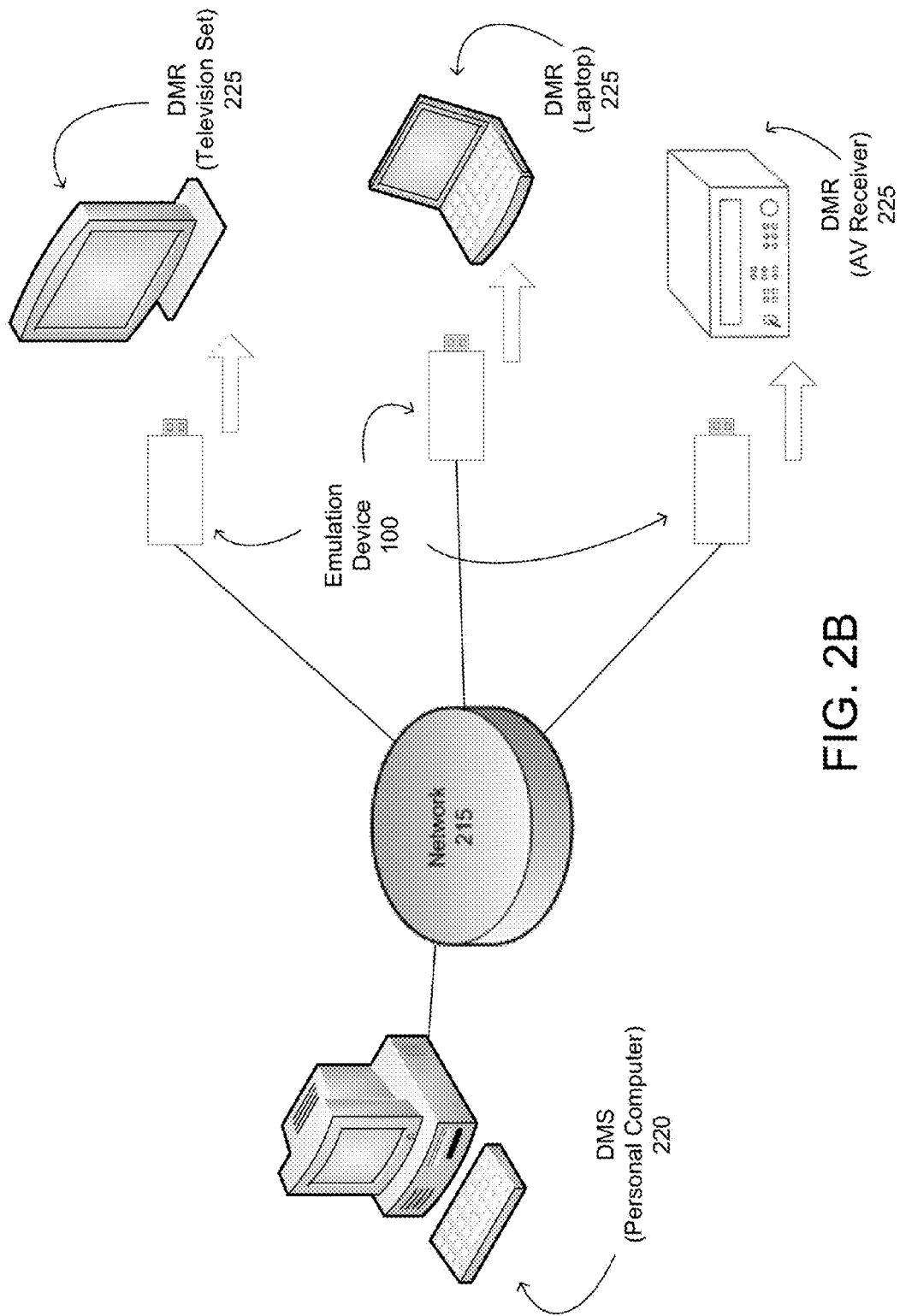
FIG. 2B is a schematic pictorial diagram that illustrates various connections that can be made by using an emulation device in a networked environment.

Although the connection between DMS 205 and the emulation device 100 is illustrated as an Ad-Hoc connection in FIG. 2A, the connection may be achieved indirectly through another network device, such as a router and/or switch. FIG. 2B is a block diagram illustrating an exemplary environment, in which an embodiment of the emulation device 100 is used in an infrastructure network. A network 215 links the DMS 220 to a number of emulation devices 100 that are coupled to various types of DMRs 225. The network 215 can generally be a data network, such as a Local Area Network (LAN), but it may also be a Wide Area Network (WAN) or the Internet. In this example, the DMS 220 is a general purpose personal computer (PC) that stores the user's multimedia library, and acts as a server. As mentioned above, other devices including network attached storages (NAS) or portable media players may also function as the DMS 220. DMS 220 can be any device capable of supplying media content to other devices in the network 215. Also, unlike the previous example shown in FIG. 2A, the connection between the DMS 220 and the network 215 in FIG. 2B can be a wired connection, while the network 215 and each of the emulation devices 100 are connected wirelessly.

The DMRs 225 linked to the network 215 may include typical entertainment devices like televisions, Blu-ray players or AV components, as well as other computers, such as laptop and/or tablets. As noted above, it is sufficient that a DMR natively support playing media files stored in a storage device connected via their peripheral interface. The DMRs 225 shown in FIG. 2B are attached to their corresponding emulation devices 100, and each DMR 225 acts as a client having different media rendering capabilities and varying levels of processing power.

Because each DMR 225 may have a different feature set and may have a different mechanism for communicating with other devices in the network, the emulation device preferably includes automated discovery and configuration routines that simplify connecting the devices. In one embodiment, for use in the infrastructure mode, the emulation device may use Bonjour protocol, developed by Apple computer, to advertise the services it provides on the network 215. This allows networked DMS devices, such as the computer (e.g. DMS 220) running Bonjour protocol compliant software (e.g., iTunes) to discover DMRs 225 (connected to emulation devices) in the network 215. Other networking protocols providing similar functions, such as UPnP and its extensions, may be also used by the emulation device to provide even greater interoperability between the networked devices. In addition, the aforementioned automated device discovery/configuration mechanism can be modified to allow DMRs to discover available DMSs in the network 215.

The media stream data (e.g., packets of PCM data) transmitted via the network preferably comprises Transmission Control Protocol (TCP) segments that are specified by the real-time streaming protocol (RTSP). RTSP is a standard communication protocol designed for use in entertainment communications systems to control DMS, and is well known to those skilled in the art. Although TCP is preferably used as a transport protocol for its robustness, datagram protocols such as User Datagram Protocol (UDP) may also be used, particularly in applications where the overhead associated with TCP would be undesirable.

In addition to RTSP, the Real-time Transport Protocol (RTP) and RTP Control Protocol (RTPC) may also be used to further optimize streaming media content. Although TCP automatically provides guaranteed packet delivery and correct sequencing, TCP favors reliability over timeliness delivery of data. Further, the timing and sequence information provided by RTP can be particularly useful when a control command is issued from the emulation device to the DMS.

For example, the emulation device may periodically provide information about where it is in the playback of the media stream. This may be accomplished by the emulation device transmitting an indication of the packet currently being played back. Alternatively the emulation device may indicate the data packet just received as well as the status of the device's buffer. This information is useful to the DMS for multiple purposes. For example, if the DMS determines that the buffer on the emulation device is low, additional data may be transmitted to the emulation device in faster than real time, to insure that the emulation device's buffer does not become completely empty.

Exemplary Steps for Streaming Media Content

Figure 3:
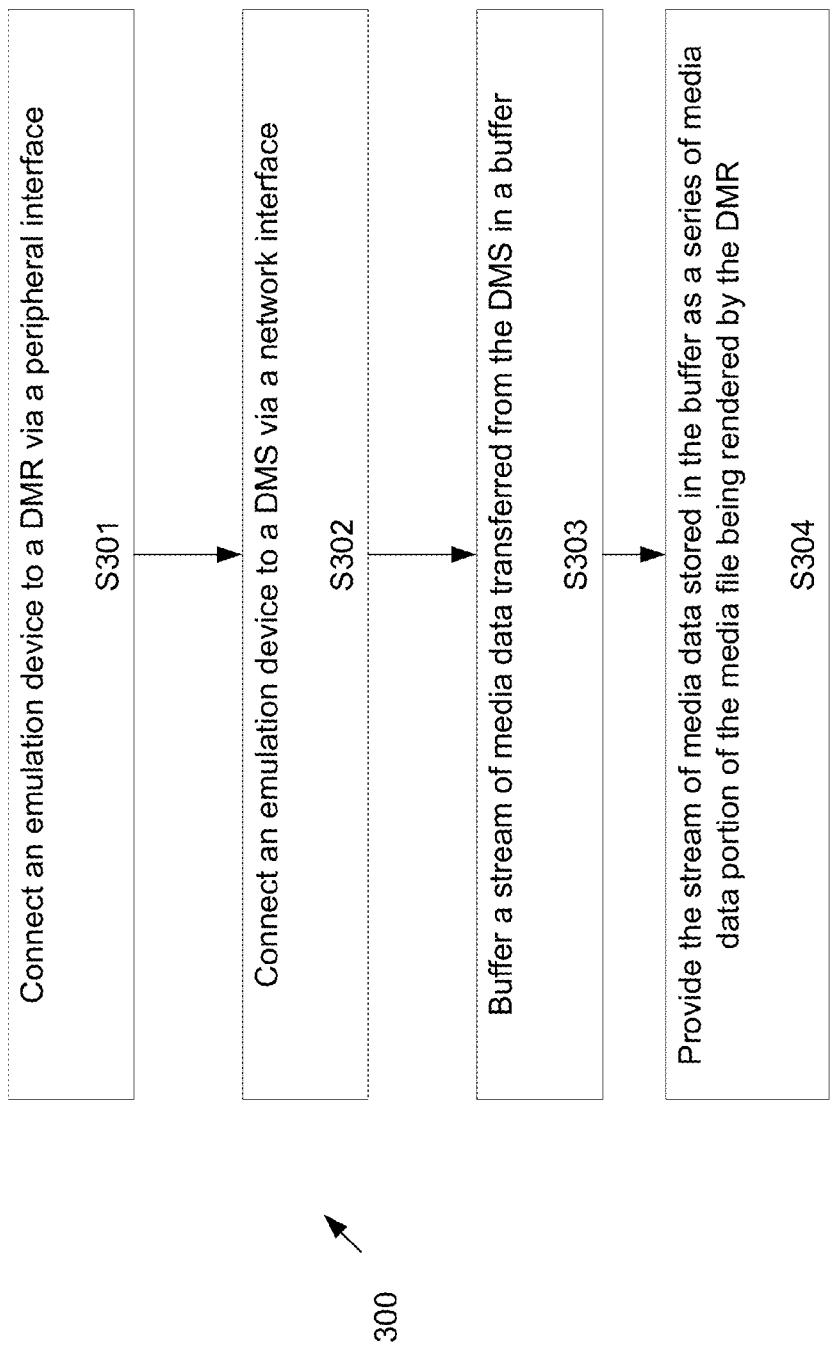
FIG. 3 is a flowchart illustrating exemplary steps for streaming media content from a digital media server to a digital media renderer by using an emulation device, in accordance with an embodiment of present invention.

FIG. 3 illustrates exemplary steps 300 for streaming media content from a DMS to a DMR by using an embodiment of emulation device of the present disclosure.

To begin, in S301, a connection between the emulation device and the DMR is made by using an appropriate peripheral interface. When the devices are connected, the DMR may automatically initiate a communication with the emulation device by using a conventional protocol suitable for the peripheral interface connecting the devices. For instance, if the devices are connected via a USB interface, the DMR may send a message requesting that the emulation device identify itself in accordance with the USB protocol. The emulation device may respond with a message that identifies itself as a storage device and other identification details, such as storage volume information, Master Boot Record (MBR), Partition Boot Record (PBR), as well as directory structure.

As mentioned, the emulation device may include storage components, such as a flash memory, and actual details of such component may be provided to the DMR. In the preferred embodiment, however, the emulation device emulates a virtual storage device by providing a set of predetermined information to the DMR. A storage device can be emulated as having a single primary partition, formatted, for example, with FAT32 file-system. It may, however, be appreciated by those skilled in the art, that any file-system understandable by media viewer can be used. Upon recognizing the emulation device as a storage device having a compatible file system, the DMR may request the contents of the root directory. In return, the emulation device can provide a single media file, for example, "AirPlay.wav", which may be selectable by the user via a user interface of the DMR.

Preferably, the media file provided to the DMR is a container or a wrapper format made of a series of modular parts. In Resource Interchange File Format (RIFF), the modular parts are called "chunks." In QuickTime/MP4 file formats, the modular parts are called "atoms." The file header of the media file specifies the metadata as well as the sequence of the modular parts in the media file. Some of the advanced container formats can support multiple audio and video streams, subtitles, chapter-information, and various other metadata along with the synchronization information needed to play back the various streams together.

The file header of the media file provided to the media renderer can be set by the emulation device as needed or in a predetermine way, to allow the media renderer to play the emulated media file. For instance, the emulation device can set the size, sample rate, bit rate, as well as the number of channels of the given media file. In some embodiments, the emulation device may be configured to obtain the metadata or other information regarding the media content streamed from the media server, and use such information to formulate the file header of the emulated media file.

In S302, the emulation device is connected to a DMS available to stream media content. As previously mentioned, the emulation device may include one or more of automated discovery and configuration routines for automatically connecting the devices. One example of such a discovery process uses Bonjour protocol, which is technology that enables automatic discovery of computers, devices, and services on a network. The protocol supports Zero Configuration Networking, and allows devices to automatically find each other without the need for a user to enter IP addresses or configure DNS servers. Various aspects of Bonjour protocol are disclosed in the white paper entitled "Bonjour" published by Apple Computer, Inc., which is hereby incorporated by reference in its entirety. Since Bonjour protocol provides interconnectivity to limited types of devices (e.g., Apple endorsed products), in one embodiment, the emulation device supports additional networking protocols, such as UPnP, that provide similar automatic discovery and configuration functionality.

To facilitate communications between the DMS and the DMR, such as to provide media sharing functionality, the emulation device will advertise over the network that it is available to receive media stream data. In doing so, the emulation device will publish various information, such as the availability of a service, the name of the device providing the service, the network address of the device, and one or more configuration parameters that are related to the service. In this example for streaming music, the registration of the available service may identify particular audio capabilities of the system (e.g., 44.1 kHz sample rate, 16-bit sample size, and 2-channel/stereo samples). The registration of the service might also include security, encryption, compression, and other capabilities and/or parameters that are necessary for communicating with the device.

Once the emulation device is discovered, the DMS (e.g., personal computer running iTunes®) will recognize the emulation device as a destination to which it can stream the audio data. Accordingly, the DMR may be presented as a selectable destination within the user interface of the DMS. When the user selects the DMR as the destination for his music, a connection for streaming media data from the DMS to the DMR is established.

In some embodiments, however, a variety of communications may occur before establishing a connection or before streaming media data to the emulation device. For instance, the emulation device might include a security feature, and the user may be prompted for a password for connecting the DMS and the emulation device. Additionally, the emulation device may send a message to the DMS and indicate that it is not ready to accept media stream data.

In S303, the emulation device receives and buffers a predetermined amount of the streamed media data to emulate the media file. As described above, the original media files which may be stored in the DMS include, for example, MP3 (Motion Picture Expert's Group Layer 3), AAC (Advanced Audio Coding a/k/a MPEG-4 audio), WMA (Windows Media Audio), etc. It is preferred that the DMS decodes these various audio formats by using an appropriate software and codecs, and provides a stream of PCM data, which would be the digital representation of an analog signal for the user's selected music. Also, the buffer implemented in the emulation device may be a ring buffer of a predetermined size, which lends itself to buffering data streams.

Using this buffer, the emulation device is capable of presenting the PCM data to the DMR at a rate that is at least equal to the data-rate of the emulated media file format, such as Waveform file format (WAV) or Audio Interchange file format (AIFF). That is, the average throughput of the emulation device to the DMR (e.g., data transfer rate from the emulation device to the DMR) is preferably no less than the amount of data needed to be read by the DMR (e.g., bit-rate of the emulated media file) for continuous playback of the streamed media content.

In one embodiment, the emulation device emulates a Resource Interchange File Format (RIFF) media file from the streamed PCM data. In operation, the emulation device provides a RIFF header when the DMR selects the emulated media file, such as "AirPlay.wav".

RIFF files consist entirely of tagged "chunks". Two chunk identifiers: "RIFF" and "LIST", introduce a chunk that can contain sub-chunks. Their chunk data, after the identifier and length, has a 4 bytes field containing an ASCII identifier indicating the format of this particular chunk (e.g., "WAVE"). The "Wave" format consists of two sub-chunks: "fmt" and "data". The "fmt" sub-chunk describes various details of sound data, such as audio format (e.g., PCM), number of channels (e.g., stereo), sample rate (e.g., 44.1 kHz), as well as number of bits per sample (e.g., 16 bits per sample). The "data" sub-chunk contains the size of the data and the actual sound data. Since the emulation device controls the mapping from virtual storage device block address to the address of buffer containing the PCM data stream, the actual sound data is read from the ring buffer that stores the streamed PCM data. AIFF is another file format that divides a file into a number of chunks, which accepts uncompressed PCM data for its sound data chunks.

It should be noted that, even though the DMS may "push" the media stream data to the emulation device, the media content is not rendered on the DMR until the DMR plays the emulated media file (e.g., AirPlay.wav). The playback of the emulated file may occur automatically or manually upon the user's command, depending on the design of the DMR. For example, the DMR may have a display for presenting the directory structure of the emulated storage device, and allow the user to select the emulated file. Accordingly, when the DMR plays the emulated media file, the emulation device provides the buffered media stream data as the series of media data portions (e.g., media data chunks) of the emulated media file, in S314. To achieve this, the emulation device may map the memory address of the media data portions of the media file to the memory location of the buffer, or the file header provided to the DMR could provide the necessary logical link to the memory location of the buffer.

Regardless of when the DMR actually renders the emulated media file, the emulation device may start filling the buffer automatically as soon as a connection is established with the DMS. If the DMS is not streaming any media data when the devices are connected, the emulation device may fill the buffer with PCM data that represents silent sound until valid PCM data is received from the DMS. The DMR then begins playing back the streamed media content once the buffer has reached a predetermined capacity. For example, the ring buffer of the emulation device may have a size allowing a total of 10 seconds of buffering, but the emulation device may begin supplying the buffered data when the buffer contains at least 3 seconds of streamed PCM data. Generally, it is preferred for the emulation device to start supplying the buffered data as the data portion of the emulated media file to the DMR within 4 seconds of receiving the initial media data stream. Additionally, it is possible for the emulation device to dynamically adjust the buffer size, depending on, for example, the network traffic or reliability conditions.

The specification has described embodiments of an emulation device as well as methods suitable for streaming media content from a media server to a media renderer by using the emulation device. The invention is, however, not limited to these examples. Embodiments have been described above with the aid of functional building blocks illustrating the implementation of specified functions and relationships thereof. Also, the illustrated steps are set out to explain the embodiment shown, and it should be anticipated that ongoing technological development may change the manner in which particular functions are performed. The boundaries of the functional building blocks and steps in the flowchart have been arbitrarily defined herein for the convenience of the description. Alternative boundaries can be defined as long as the specified functions and relationships thereof are appropriately performed. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method for streaming media data from a remote media server to a media renderer via an emulation device comprising:
    connecting an emulation device to a media renderer via a USB peripheral interface, wherein the emulation device is recognized by the media renderer as a storage containing at least one media file;
    connecting the emulation device to a remote media server via a network interface;
    requesting by the media renderer to read media data stored in the at least one media file;
    transferring a stream of media data from the remote media server to the emulation device, wherein the emulation device stores the stream of media data in a buffer, wherein the buffer is used to emulate the media file;
    transferring the requested media data from the emulated media file to the media renderer;
    rendering the emulated media file by the media renderer.

2. The method of claim 1, wherein the emulation device provides a set of emulated metadata to the media renderer to be recognized as said storage containing at least one media file.

3. The method of claim 2, wherein the media file contained in the storage is a container file having one or more media data chunks.

4. The method of claim 3, wherein the stream of media data received from the remote media server is directly usable as the media data chunks without a transcoding process.

5. The method of claim 4, wherein the set of metadata includes a file header of the media file.

6. The method of claim 5, wherein the file header comprises one or more of tagged chunks for specifying a format of the media file.

7. The method of claim 6, wherein the set of emulated metadata maps the logical block address of the media data chunks to a set of memory addresses of the buffer.

8. The method of claim 7, wherein the emulation device fills the buffer with template media data representing default media content when the stream of media data is not received form the media server.

9. The method of claim 7, wherein the stream of media data from the media server is a stream of pulse code modulation data.

10. The method of claim 9, wherein the media file is Waveform Audio File Format (WAVE) or Audio Interchange File Format (AIFF).

11. The method of claim 10, wherein the stream of PCM data in the buffer is provided to the media renderer as a series of media data chunks of the media file.

12. The method of claim 1, wherein connecting the emulation device to the remote media server further comprises: identifying one or more services provided by the media renderer; broadcasting the identified services on a network by using one or more device discovery protocols, wherein at least one media server on the network identifies the emulation device as an available destination to transfer the stream of media data.

13. The method of claim 12, wherein the emulation device provides a hold signal to the media server, if the emulation device is not ready to receive the stream of media data.

14. An emulation device for streaming media content from a remote media server to a media renderer, comprising:
    a USB peripheral interface for connecting the emulation device to the media renderer;
    one or more wireless network interfaces for receiving a stream of media data from the remote media server;
    a memory for storing at least one of the stream of media data and a set of executable instructions for:
        emulating a storage comprising a media file recognizable by the media renderer such that when the emulation device is connected to the media renderer, the emulation device will be recognized as a storage device storing at least the media file, and
        establishing connection with the remote media server, wherein the media file is emulated by storing the at least one of the stream of media data streamed between the remote media server and the emulation device in a buffer of said memory used for emulating the media file; and
    a processing unit for executing said executable instruction.

15. The emulation device of claim 14, wherein the buffer is implemented in a ring buffer structure of a predetermined size.

16. The emulation device of claim 15, wherein the memory comprises at least one volatile memory for implementing the buffer.

17. The emulation device of claim 16, wherein the memory includes at least one non-transitory storage medium for storing the set of executable instructions.

18. The emulation device of claim 14, wherein the one or more wireless network interfaces use an on-board Printed Circuit Board (PCB) antenna.

19. The emulation device of claim 14, wherein the emulation device is configured to obtain power from the media renderer via the USB peripheral interface.

20. The emulation device of claim 14, wherein the set of executable instructions further comprises instructions for identifying services available from the media renderer.

21. The emulation device of claim 14, wherein the emulation device is configured to fill the buffer with template data representing empty media content, when the stream of media data is not received from the media server.

22. The emulation device of claim 14, wherein the emulation device does not transcode the stream of media data received from the media server.

23. An emulation device interposed between a media server and a media renderer, wherein the emulation device is configured to buffer a stream of pulse code modulation (PCM) data transmitted from the media server and provide the buffered PCM data as a series of media data chunks of a static audio file to be rendered by the media renderer.

24. The emulation device of claim 23, wherein the PCM data is audio data having two channels of 16 bit resolution and a sampling rate of 44.1 kHz.

* * * * *